United States Patent [19]

Chandran et al.

[11] Patent Number: 5,252,663
[45] Date of Patent: Oct. 12, 1993

[54] FORMALDEHYDE-FREE CROSSLINKING EMULSION POLYMER SYSTEMS BASED ON VINYL ESTER DIALKOXYHYDROXYETHYL ACRYLAMIDE CO- AND TERPOLYMERS

[75] Inventors: Rama S. Chandran, South Bound Brook; Carmine P. Iovine, Bridgewater; Paul R. Mudge, Belle Mead; John C. Leighton, Flanders; Malcolm F. Hallam, Branchburg, all of N.J.

[73] Assignee: National Starch and Chemical Investment Holding Corporation, Wilmington, Del.

[21] Appl. No.: 703,931

[22] Filed: May 22, 1991

[51] Int. Cl.⁵ .............................. C08K 5/00
[52] U.S. Cl. ..................... 524/813; 526/304
[58] Field of Search ................ 524/813, 811

[56] References Cited

U.S. PATENT DOCUMENTS

| | | |
|---|---|---|
| 4,239,676 | 9/1981 | Czauderna et al. ............ 260/29.6 |
| 4,760,168 | 7/1988 | Schirmann ...................... 560/170 |
| 4,774,283 | 9/1988 | Goldstein ........................ 524/816 |
| 4,778,869 | 10/1988 | Schirmann et al. ............ 526/304 |
| 4,808,660 | 2/1989 | Schmeing et al. ............. 524/812 |
| 4,835,320 | 5/1989 | Blanc et al. ................... 568/463 |
| 4,851,577 | 7/1989 | Chastrette et al. ............ 564/208 |
| 4,918,139 | 4/1990 | Cuirassier et al. ............ 524/813 |
| 4,939,200 | 7/1990 | Stack et al. ................... 524/501 |
| 5,021,529 | 6/1991 | Garrett ........................... 526/304 |

FOREIGN PATENT DOCUMENTS

| | | |
|---|---|---|
| 0020000 | 12/1980 | European Pat. Off. . |
| 0237643 | 9/1987 | European Pat. Off. . |
| 0302588 | 8/1989 | European Pat. Off. . |

*Primary Examiner*—Christopher Henderson
*Attorney, Agent, or Firm*—Jane E. Gennaro; Ellen T. Dec; Edwin M. Szala

[57] ABSTRACT

Formaldehyde free crosslinking emulsion polymers are prepared by the addition of N-(2,2-dialkoxy-1-hydroxy)ethyl acrylamide to a vinyl ester based polymer. The resultant emulsions can be used as binders for nonwovens or fiberfill or as woodworking adhesives.

10 Claims, No Drawings

FORMALDEHYDE-FREE CROSSLINKING EMULSION POLYMER SYSTEMS BASED ON VINYL ESTER DIALKOXYHYDROXYETHYL ACRYLAMIDE CO- AND TERPOLYMERS

Emulsion polymers prepared from vinyl ester, particularly those prepared from vinyl acetate and ethylene, have wide application as adhesives and as binders in industry. Unfortunately, these binders sometimes experience unacceptable loss in strength in the presence of water and other solvents. In an attempt to reduce these problems, various crosslinking comonomers and/or post-added crosslinkers have been incorporated into the binders. The most successful of these crosslinkers have been N-methylol acrylamide [NMA] and urea-formaldehyde [U/F] condensates. While the latter are low in cost, compatible with aqueous emulsions and rapidly cured under acid catalysis, their consequent emission of low levels of formaldehyde, a suspect carcinogen, make them undesirable for many applications.

Many attempts have been made to overcome or minimize this deficiency, especially after the potential carcinogenicity and irritant properties of formaldehyde became widely recognized. In this regard many non-formaldehyde containing functional monomers have been added to the emulsion polymers. While many of the functional monomers such as acrylamido glycolic acid and its derivatives have provided acceptable results in acrylate containing emulsions, it has been very difficult to obtain comonomers which would satisfactorily copolymerize with adhesives and binders containing vinyl esters, particularly vinyl acetate. Thus, most of the functional monomers which can readily be incorporated into acrylic emulsion polymers do not yield comparable results in vinyl acetate containing systems since these monomers hydrolyze during emulsion polymerization with the hydrophilic vinyl esters thereby losing their effectiveness.

We have now found that when N-(2,2-dialkoxy-1-hydroxy)ethyl acrylamide is polymerized into emulsion polymers containing substantial amounts of vinyl esters the resultant polymers exhibit excellent performance as nonwoven binders or adhesives in non-formaldehyde containing systems. Thus, the present invention is directed to emulsion polymers comprising at least about 50% vinyl ester and 1 to 15% by weight of the N-(2,2-dialkoxy-1-hydroxy)ethyl acrylamide. The use of N-(2,2-dialkoxy-1-hydroxy)ethyl acrylamide provides superior results when used in vinyl ester copolymer systems and particularly in ethylene/vinyl acetate copolymers. Moreover, the N-(2,2-dialkoxy-1-hydroxy)ethyl acrylamide functional comonomer may be used in vinyl acetate containing emulsion copolymers prepared in the presence of surfactants and/or protective colloids; as such, the emulsion polymers of the present invention may be readily formulated into a wider range of non-formaldehyde systems including those used as binders for nonwovens, for fiberfill and also in woodworking adhesive compositions.

While any N-(2,2-dialkoxy-1-hydroxy)ethyl acrylamide having 1 to 4 carbon atoms in the alkoxy group can be utilized herein, we have found N-(2,2-dimethoxy-1-hydroxy)ethyl acrylamide [DMHEA] to be the most commercially viable. The N-(2,2-dialkoxy-1-hydroxy)ethyl acrylamide monomers and their preparation are described in U.S. Pat. No. 4,918,139 issued Apr. 17, 1990 to Cuirassier, et al.

While vinyl acetate is the MOBT commonly employed vinyl ester, other $C_1$ to $C_{13}$ esters of alkanoic acids are also useful herein. Typical examples of vinyl esters include: vinyl formate, vinyl propionate, vinyl butyrate, vinyl isobutyrate, vinyl valerate, vinyl 2-ethylhexanoate, vinyl isooctanoate, vinyl nonmate, vinyl decanoate, vinyl pivalate, vinyl versatate and the like.

Additionally, depending on the end use of the resultant emulsion, the vinyl ester may be polymerized with varying amounts, up to about 49% by weight, of one or more other copolymerizable comonomers. Suitable comonomers include olefins such as ethylene, vinyl halides such as vinyl chloride and $C_1$ to $C_8$ alkyl acrylates or methacrylates. The precise amount of the copolymerizable comonomer used will vary depending upon the nature of the comonomer as well as the end use of the emulsion. Thus, the nature of ethylene is such that it can be incorporated into vinyl ester emulsion systems only at levels up to about 35% by weight. In contrast, the vinyl halides as well as the alkyl acrylates and methacrylates can be used at higher levels, e.g., up to about 49% by weight of the polymer.

Optionally, small amounts of other functional monomers, including coreactive comonomers may be employed. Thus, olefinically unsaturated carboxylic acids having from 3 to 6 carbon atoms or the alkanedioic acids having from 4 to 6 carbon atoms may be used, e.g., acrylic acid, methacrylic acid, crotonic acid, itaconic acid, maleic acid or fumaric acid or mixtures thereof in amounts sufficient to provide up to about 10% by weight of monomer units in the final copolymer. Additionally, the use of up to about 15% by weight of an hydroxyalkyl ($C_2$ to $C_4$) acrylate or methacrylate has been found to be beneficial in furthering the performance of the N-(2,2-dialkoxy-1-hydroxy)ethyl acrylamide.

Also, polyunsaturated copolymerizable monomers may be present in small amounts, i.e., up to about 1% by weight. Such comonomers would include copolymerizable polyolefinically unsaturated monomers such as vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide, triallyl cyanurate, etc. Finally, certain copolymerizable monomers which assist in the stability of the copolymer emulsion, e.g. acrylamide and vinyl sulphonic acid, are also useful herein. These latter monomers, if employed, are added in very low amounts of from 0.1 to about 2% by weight of the monomer mixture.

Conventional batch, semi-batch or continuous polymerization procedures may be utilized herein. Generally, the monomers are polymerized in an aqueous medium (under pressures not exceeding 100 atmospheres if ethylene is employed) in the presence of a catalyst and at least one emulsifying agent.

If ethylene is used in the polymerization, the quantity of ethylene entering into the copolymer is influenced by the pressure, the agitation and the viscosity of the polymerization medium. Thus, to increase the ethylene content of the copolymer, higher pressures are employed. A pressure of at least about 10 atmospheres is most suitably employed. The mixture is thoroughly agitated to dissolve the ethylene, the agitation being continued until substantial equilibrium is achieved. This generally requires about 15 minutes; however, more or less time may be required depending upon the vessel, the efficiency of the agitation, the specific system and the like.

Suitable polymerization catalysts are the water-soluble free-radical formers generally used in emulsion polymerization, such as hydrogen peroxide, sodium persulphate, potassium persulphate and ammonium persulphate as well as tert-butyl hydroperoxide, in amounts of between 0.01 and 3% by weight, preferably 0.01 and 1% by weight based on the total amount of the emulsion. They can be used alone or together with reducing agents such as ferrous salts, sodium dithionite, sodium metabisulphite, sodium thiosulphate and ascorbic acid, as redox catalysts in amounts of 0.01 to 3% by weight, preferably 0.01 to 1% by weight based on the total amount of the emulsion. The free-radical formers can be charged in the aqueous emulsifier solution and/or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The emulsifying agents are those generally used in emulsion polymerization, as well as optionally present protective colloids. It is also possible to use emulsifiers alone or in mixtures with protective colloids. In the case of emulsions which are to be formulated into binders for nonwovens or fiberfill, it is especially advantageous to use an anionic, cationic or nonionic emulsifier or surfactant.

The emulsifiers can be anionic, cationic, nonionic surface-active compounds or mixtures thereof. Suitable anionic emulsifiers are, for example, alkyl sulphonates, alkylaryl sulphonates, alkyl sulphates, sulphates of hydroxyalkanols, alkyl and alkylaryl disulphonates, sulphonated fatty acids, sulphates and phosphates of polyethoxylated alkanols and alkylphenols, as well as esters of sulphosuccinic acid. Suitable cationic emulsifiers are, for example, alkyl quaternary ammonium salts and alkyl quaternary phosphonium salts. Examples of suitable nonionic emulsifiers are the addition products of 5 to 50 moles of ethylene oxide adducted to straight-chained and branch-chained alkanoic with 6 to 22 carbon atoms, or alkylphenols, or higher fatty acids, or higher fatty acid amides, or primary and secondary higher alkylamines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to 10, preferably from about 2 to about 8, weight percent of the monomers used in the polymerization.

As noted above, various protective colloids may also be used in place of or in addition to the emulsifiers described above. The use of protective colloide is especially desirable in polymer emulsions which are to be formulated into woodworking adhesives. Suitable colloids include partially acetylated polyvinyl alcohol, e.g., up to 50% acetylated, casein, hydroxyethyl starch, carboxymethyl cellulose, gum arabic and the like, as known in the art of synthetic emulsion polymer technology. In general, these colloids are Used at levels of 0.5 to 4% by weight on the total emulsion.

The emulsifier or protective colloid used in the polymerization can also be added in its entirety to the initial charge to the polymerization zone or a portion of the emulsifier, e.g., from 25 to 90% thereof, can be added continuously or intermittently during polymerization. The particle size of the latex can be regulated by the quantity of nonionic or anionic emulsifying agent or protective colloid employed. To obtain smaller particle sizes, greater amounts of emulsifying agents are used. As a general rule, the greater the amount of the emulsifying agent employed, the smaller the average particle size. The polymerization reaction is generally continued until the residual vinyl acetate monomer content is below about 1%. The completed reaction product is then allowed to cool to about room temperature, while sealed from the atmosphere.

The emulsions are produced and used at relatively high solids contents, e.g., between 35 and 70%, preferably not less than about 50%, although they may be diluted with water if desired.

When the emulsion is to be formulated into a binder for nonwovens or fiberfill, there may also be present in the latex binders other additives conventionally employed in similar binders including defoamer, pigments, catalysts, wetting agents, thickeners, external plasticizers, etc. The choice of materials as well as the amounts employed are well known to those skilled in the art. These materials may be added just before application, if their stability in the dispersion or solution is low, or they may be formulated into the aqueous dispersion of the binder and stored if the stability in aqueous dispersion is high.

Binders described above are suitably used to prepare nonwoven fabrics by a variety of methods known to the art which, in general, involve the impregnation of a loosely assembled web of fibers with the binder latex, followed by moderate heating to dry the web. This moderate heating also serves to cure the binder, that is, by forming a crosslinked interpolymer. Before the binder is applied it is optionally mixed with a suitable catalyst for the crosslinking reaction. Thus, acid catalysts such as mineral acids, e.g., HCl, or organic acids, e.g., oxalic acid, or acid salts such as ammonium chloride, are suitable to be used as known in the art. The amount of catalyst is generally about 0.5 to 2% of the total resin.

The starting fibrous web can be formed by any one of the conventional techniques for depositing or arranging fibers in a web or layer. These techniques include carding, garnetting, air-laying and the like. Individual webs or thin layers formed by one or more of these techniques can also be lapped or laminated to provide a thicker layer for conversion into a heavier fabric. In general, the fibers extend in a plurality of diverse directions in general alignment with the major plane of the overlapping, intersecting and supporting one another to form an open porous structure. When reference is made to "cellulose", fibers, those fibers containing predominantly $C_6H_{10}O_5$ groupings are meant. Thus, examples of the fibers to be used in the starting web are the natural cellulose fibers such as wood pulp and chemically modified celluloses such as regenerated cellulose. Often the fibrous starting web contains at least 50% cellulose fibers, Whether they be natural or synthetic or a combination thereof. Other fibers in the starting web may comprise natural fibers such as wool; artificial fibers such as cellulose acetate; synthetic fibers such as polyamides, i.e.,nylon, polyesters, i.e., "Dacron", acrylics, i.e., "Dynel", "Orlon", polyolefins, i.e., polyethylene, polyvinyl chloride, polyurethane, etc., alone or in combination with one another.

This fibrous web is then subjected to at least one of several types of latex bonding operations to anchor the individual fibers together to form a self-sustaining web. Some of the better known methods of bonding are overall impregnation, spraying or printing the web with intermittent or continuous, straight or wavy lines or areas of binder extending generally transversely or diagonally across the web and additionally, if desired, along the web.

The amount of binder, calculated on a dry basis, applied to the fibrous starting web suitably ranges from about 10 to about 100 parts or more per 100 parts of the starting web and preferably from about 20 to about 45 parts per 100 parts of the starting web. The impregnated web is then dried and cured. Thus, the fabrics are suitably dried by passing them through an air oven or over a series of heated cans or the like and then through a curing oven or sections of hot cans. ordinarily, convection air drying is effected at 65°-95° C. followed by curing at 145°-155° C.. However, other time-temperature relationships can be employed as is well known in the art, with shorter times at higher temperatures or longer times at lower temperatures being used. For example, the curing step can be carried out at 135° C. for about 15 minutes or more in a laboratory or pilot line but may require only 2 to 20 seconds on high pressure, high efficiency steam cans used in high speed production. If desired, the drying and curing can be effected in a single exposure or step.

In the case of vinyl ester emulsions for fiberfill, it is generally desirable to employ polymers comprising at least about 85% by weight of the vinyl ester, preferably vinyl acetate and to carry out the polymerization in the presence of an emulsifier or surface active agent.

Fiberfill is a generic term used to describe a variety of nonwoven fabrics for a variety of end uses. The common feature of all fiberfill products is a measure of loft or thickness in the fabric. This loft is a characteristic of value because it imparts insulation to outerwear and bed quilt stuffing, cushioning in furniture padding, dust holding capacity to filter media and resiliency to scrubbing pads. The most common construction of a fiberfill product is a loosely garnetted, cross-lapped or air laid web of 6 to 30 denier polyester staple fibers which is bonded (locked in its particular fiber arrangement) by an emulsion polymer binder. Fiberfill products can be made with other fibers, e.g., polyamide, cellulose acetate, rayon, glass, alone or in blends with each other. Some fiberfill is sold without a bonding agent but the material will lack durability, tensile strength and resiliency when compared to a bonded product. Bonding methods other than emulsion polymers, such as needle punching and meltable fibers and powders are also used, but the polymer emulsion method produces the optimum strength/loft ratios for the majority of fiberfill markets.

In the case of vinyl ester containing emulsions for use as woodworking adhesives, the emulsion polymer is prepared in a protective colloid, preferably polyvinyl alcohol, with at least about 85% of the vinyl ester monomer. The resultant emulsions may be used in any conventional woodworking adhesive compositions and formulated with such additives as are commonly used in the production of these adhesives. The adhesives may also be formulated with 1 to 7% of polymer solids, by weight, of a fusion aid such as tetrahydrofurfuryl alcohol, ethylene glycol diacetate and ethylene glycol monoethyl ether acetate as taught in U.S. Pat. No. 4,474,915, the disclosure of which is incorporated herein by reference.

The addition of acidic, metal salt curing agents may also be desired in order to accelerate the cure of the formulated adhesive. The preferred curing agents for use herein comprise acidic, metal salts from the group consisting of chromic nitrate, chromic perchlorate, aluminum nitrate, aluminum chloride, zinc nitrate and para-toluene outphonic acid. The proportion of acidic, metal salt curing agent which is added will depend upon the rate of cure which is desired in the final product but a practical range hall been found to be from about 0.003 to 0.12 gram equivalents of curing agent (anhydrous basis) for each 100 grams of the total weight of the blend of the adhesive composition.

If fusion aids are used in the formulation, it may also be desirable to add crosslinking inhibitors such as are described in U.S. Pat. No. 4,085,074 issued Apr. 18, 1978 to M. C. Woo and re-issued as U.S. Pat. Re. No. 30,576. Typical inhibitors include ammonia, alkylamines (e.g., triethylamine) and alkanolamines (e.g., triethanolamine and N-methylethanolamine). When used, they are added ordinarily in amounts such that the mole ratio of the inhibitor to the curing agent is in the range from 0.1 to 1.7. They may be added to the vessel at the end of the polymerization reaction or they may be post added prior to or with the curing agent. Their addition improves the storage stability of the adhesives.

The following examples are given to illustrate the present invention, but it will be understood that they are intended to be illustrative only and not limitative of the invention. In the examples, all parts are by weight and all temperatures in degrees Celsius unless otherwise noted. Emulsion polymers were prepared according to the examples listed in Table I. Detailed descriptions of each follow after this Table.

TABLE I

| Example # | Major monomers % w/w | Minor monomers % w/w | Solids % | Viscosity cP (20 rpm) | pH | Grit % |
| --- | --- | --- | --- | --- | --- | --- |
| 1 |  | 5.2 NMA | 52.0 | 80 | 4.9 | 0.002 |
| 2 |  | 8.4 AGA, 6.7 HPA | 47.5 | 33 | 3.5 | 0.001 |
| 3 | 85 Vinyl Acetate | 8.2 AGAME, 6.7 HPA | 49.7 | 2100 | 2.2 | 0.002 |
| 4 | 15 Ethylene | 8.9 MAGME, 6.7 HPA | 55.6 | 40 | 2.4 | 0.023 |
| 5 |  | 5.2 DMHEA, 3.9 HPA | 55.2 | 45 | 3.7 | 0.004 |
| 6 |  | 3.0 NMA | 50.0 | 120 | 3.1 | 0.012 |
| 7 | 50 Methyl | 4.8 AGA, 3.9 HPA | 50.0 | 75 | 1.9 | 0.004 |
| 8 | Methacrylate | 4.7 AGAME, 3.9 HPA | 50.2 | 75 | 1.7 | 0.004 |
| 9 | 50 Butyl Acrylate | 5.1 MAGME, 3.9 HPA | 50.3 | 33 | 2.8 | 0.057 |
| 10 |  | 5.2 DMHEA, 3.9 HPA | 48.8 | 225 | 3.1 | 0.008 |
| 11 |  | 3.0 NMA | 49.4 | 74 | 3.2 | 0.004 |
| 12 |  | 4.7 AGAME, 3.9 HPA | 46.0 | 50 | 2.3 | 0.010 |
| 13 | 75 Vinyl Acetate | 6.0 AGABE, 3.9 HPA | 44.9 | 23 | 2.9 | 0.041 |

TABLE I-continued

| Example # | Major monomers % w/w | Minor monomers % w/w | Solids % | Viscosity cP (20 rpm) | pH | Grit % |
|---|---|---|---|---|---|---|
| 14 | 25 Butyl Acrylate | 5.2 DMHEA, 3.9 HPA | 48.2 | 123 | 3.5 | 0.004 |
| 15 | 100 Vinyl Acetate | 3.5 NMA | 46.3 | 55 | 3.2 | 0.002 |
| 16 | 100 Vinyl Acetate | 6.1 DMHEA | 45.7 | 53 | 4.4 | 0.003 |
| 17 | 100 Vinyl Acetate | 3.0 NMA | 52.3 | 6400 | 4.5 | 0.022 |
| 18 | 100 Vinyl Acetate | 3.0 DMHEA | 49.7 | 8200 | 4.0 | 0.048 |

NMA = N-methylol acrylamide
AGA = acrylamido glycolic acid
AGAME = AGA methyl ester
AGABE = AGA butyl ester
MAGME = methyl acrylamido glycolate methyl ether
DMHEA = N-(2,2-dimethoxy-1-hydroxy)ethyl acrylamide
HPA = 2-hydroxypropyl acrylate

EXAMPLE 1

A typical ethylene/vinyl acetate emulsion polymer containing N-methylol acrylamide was prepared as a control according to the following. A 10 liter stainless steel autoclave equipped with heating/cooling means, variable rate stirrer and means of metering monomers and initiators was employed. To the 10 liter autoclave was charged 540 g (of a 20% w/w solution) sodium alkyl aryl polyethylene oxide sulphate (3 moles ethylene oxide), 60 g (of a 70% w/w solution) alkyl aryl polyethylene oxide (30 moles ethylene oxide), 36 g (of a 25% w/w solution in water) sodium vinyl sulphonate, 2 g sodium formaldehyde sulphoxylate, 0.6 g sodium acetate, 9 g (of a 1% solution in water) ferrous sulphate solution and 1100 g water. After purging with nitrogen all the vinyl acetate (3600 g) was added and the reactor was pressurized to 550 psi with ethylene and equilibrated at 50° C. for 15 minutes.

The polymerization was started by metering in solutions of 14 g tertiary butyl hydroperoxide in 250 g water and 11.5 g sodium formaldehyde sulphoxylate in 250 g water. The initiators were added at a uniform rate over 3.5 hours. Concurrently added with the initiators over a period of 3 hours was a solution comprising 460 g N-methylol acrylamide (48% w/w solution in water) and 0.5 g sodium acetate in 1250 g water. During the polymerization, the temperature of the reaction was maintained at 80°-85° C. and at the end of the reaction, the emulsion was transferred to an evacuated vessel (30 liters) to remove residual ethylene from the system. This product was used for comparison with other examples as listed in Table II.

EXAMPLE 2

The procedure was as in Example 1, except for the following:

a) The sodium formaldehyde sulphoxylate in the initial charge was replaced by 2.1 g ascorbic acid.

b) The monomer solution added over 3 hours comprised 356 g acrylamido glycolic acid monohydrate [AGA], 284 g 2-hydroxypropyl acrylate, and 1.7 g sodium acetate in 1200 g water, accompanied by a solution of 70 g of 30% ammonia in 350 g water.

c) The polymerization was initiated with solutions of 14.6 g of 30% hydrogen peroxide in 250 g water and 10 g ascorbic acid in 250 g water.

EXAMPLE 3

The procedure wall as in Example 2, except that the monomer solution added over 3 hours comprised 348 g acrylamido glycolic acid methyl ester [AGAME], 284 g 2-hydroxypropyl acrylate, and 1.0 g sodium acetate in 1500 g water.

EXAMPLE 4

The procedure was as in Example 3, except that 378 g methyl acrylamido glycolate methyl ether [MAGME] were used in place of AGAME.

EXAMPLE 5

The procedure was as in Example 3, except for the following:

a) The monomer solution added over 3 hours comprised 539 g N-(2,2-dimethoxy-1-hydroxy)ethyl acrylamide [DMHEA] (50% w/w solution in water, 82% active), 164 g 2-hydroxypropyl acrylate, and 1.0 g sodium acetate in 1000 g water. b) The polymerization wall initiated with solutions of 18 g of 30% hydrogen peroxide in 250 g water and 12.8 g ascorbic acid in 250 g water.

EXAMPLE 6

A typical acrylic emulsion polymer containing N-methylol acrylamide was prepared as a control according to the following. A 2 liter glass reactor equipped with a heating/cooling jacket, variable rate stirrer and means of metering monomers and initiators was employed. To the 2 liter reactor was charged 1 g (of a 20% W/W solution) sodium alkyl aryl sulphonate, 3 g (of a 70% w/w solution) alkyl aryl polyethylene oxide (30 moles ethylene oxide), 0.8 g ammonium persulphate, 0.6 g sodium acetate and 350 g water. After purging with nitrogen, 30 g methyl methacrylate and 25 g butyl acrylate were added and the reactor was equilibrated at 30° C. for 5 minutes.

The polymerization was started by heating to 78° C. and maintained by metered addition of a solution of 1.0 g ammonium persulphate in 40 g water. The initiator wall added at a uniform rate over 3.5 hours. Concurrently added with the initiators over the same period of 3.5 hours was a preemulsified blend of 220 g methyl methacrylate, 225 g butyl acrylate and 31.3 g N-methylol acrylamide (48% w/w solution in water) in a solution of 10 g (of a 20% w/w solution) sodium alkyl aryl sulphonate and 6 g (of a 70% w/w solution) alkyl aryl polyethylene oxide sulphate (30 moles ethylene oxide) in 76 g water.

During the additions and for 45 minutes afterwards, the temperature of the reaction was maintained at 78°-80° C. This product was used for comparison with other examples as listed in Table II.

EXAMPLE 7

The procedure was as in Example 6, except for the following:

a) The pre-emulsified blend contained 24.2 g acrylamido glycolic acid monohydrate [AGA] and 19.3 g 2-hydroxypropyl acrylate instead of the N-methylol acrylamide, with 120 g added water.

b) The initiation was maintained with a solution of 1.1 g ammonium persulphate in 40 g water.

EXAMPLE 8

The procedure was as in Example 6, except for the following:

a) The amount of ammonium persulphate in the initial charge was 1.0 g.

b) The preemulsified blend contained 23.6 g acrylamido glycolic acid methyl ester [AGAME] and 19.3 g 2-hydroxypropyl acrylate instead of the N-methylol acrylamide, with 108 g added water.

c) The initiation was maintained with solutions of 1.5 g ammonium persulphate in 40 g water and 1.3 g sodium metabisulphite in 40 g water.

EXAMPLE 9

The procedure wall as in Example 6, except that the preemulsified blend contained 25.7 g methyl acrylamido glycolate methyl ether [MAGME] and 19.3 g 2-hydroxypropyl acrylate instead of the N-methylol acrylamide, with 121 g added water.

EXAMPLE 10

The procedure was as in Example 6, except that the preemulsified blend contained 63.4 g N-(2,2-dimethoxy-1-hydroxy)ethyl acrylamide [DMHEA] (50% w/w solution in water, 82% active) and 19.3 g 2-hydroxypropyl acrylate instead of the N-methylol acrylamide.

In preparing the samples for testing, lengths of 15 gram per square yard polyester were saturated using a Mathis Padder and a batch of 100 parts binder, 2 parts surfactant, 1 part catalyst and sufficient water to give a 20% solids dilution, with a dry pick up of approximately 40 parts binder per 100 parts polyester web. The saturated web was dried for 2 minutes at 145° C. in a laboratory contact drier. Similar test samples were obtained using:

i) 15 gram per square yard rayon with the binder diluted to 18% solids giving a dry pick up of approximately 25 parts per 100 web and ii) 34 gram per square yard pulp with the binder diluted to 12% solids giving a dry pick up of approximately 17 parts per 100 web.

The tensile tests were run on a standard Instron tester set at 3 inch gauge length and 5 inch crosshead speed. The wet tensile was run after soaking specimens one minute in a 0.5% solution of Aerosol OT wetting agent. The solvent tensile was run after soaking the specimens one minute in methyl ethyl ketone.

The results obtained by testing the binders of Examples 1-10 are shown in Table II. Results shown reflect the average of 8 tests. Results are presented relative to the control batches which contain N-methylol acrylamide. Thus the figures against Examples 2-5 are percentages of the corresponding result for Example 1. Similarly, the figures against Examples 7-10 are percentages of the corresponding result for Example 6.

TABLE II

| Example Numbers | | EVA | | | ACRYLIC | | |
|---|---|---|---|---|---|---|---|
| | | Pulp | Rayon | Polyester | Pulp | Rayon | Polyester |
| 1 & 6 (NMA) | Dry | | (100) | | | (100) | |
| | Wet | | | | | | |
| | Solvent | | | | | | |
| 2 & 7 (AGA) | Dry | 100 | 113 | 37 | 89 | 112 | 60 |
| | Wet | 40 | 68 | 27 | 84 | 106 | 56 |
| | Solvent | 15 | 4 | 5 | 57 | 41 | 30 |
| 3 & 8 (AGAME) | Dry | 103 | 122 | 70 | 112 | 86 | 75 |
| | Wet | 54 | 75 | 43 | 77 | 88 | 78 |
| | Solvent | 18 | 14 | 10 | 89 | 73 | 37 |
| 4 & 9 (MAGME) | Dry | 103 | 155 | 67 | 100 | 106 | 72 |
| | Wet | 55 | 78 | 54 | 73 | 81 | 66 |
| | Solvent | 37 | 52 | 17 | 53 | 60 | 47 |
| 5 & 10 (DMHEA) | Dry | 107 | 85 | 82 | 119 | 140 | 101 |
| | Wet | 80 | 70 | 73 | 109 | 111 | 81 |
| | Solvent | 65 | 63 | 49 | 114 | 167 | 117 |

These results presented in Table II show that all of the crosslinkers perform quite well, compared to NMA, in an acrylic polymer. However, in an EVA polymer, all except DMHEA have deficient wet strength and solvent resistance especially on cellulosic fibers. The solvent resistance, in particular, is a stringent test of the effectiveness of the crosslinker in this kind of application. DMHEA is also unique in giving good performance across all substrates under all conditions. Further, this superior performance of DMHEA in the EVA copolymer is achieved with only 5.2 parts per 100 EVA compared with 8.4 used for AGA, 8.2 for AGAME and 8.9 for MAGME.

In addition to the above, DMHEA also has utility in vinyl/acrylic copolymers containing a high fraction of vinyl acetate, as indicated by the following Examples.

EXAMPLE 11

A typical vinyl/acrylic emulsion polymer containing N-methylol acrylamide was prepared as a control using the procedure of Example 6 except for replacing the methyl methacrylate with vinyl acetate, 50 g in the initial charge and 325 g in the preemulsified blend. The amount of butyl acrylate wall also adjusted to 5 g in the initial charge and 120 g in the preemulsified blend. This product was used for comparison with other examples as listed in Table III.

EXAMPLE 12

The procedure was as in Example 11, except that the preemulsified blend contained 23.6 g acrylamido glycolic acid methyl ester [AGAME] and 19.3 g 2-hydroxypropyl acrylate instead of the N-methylol acrylamide, with 130 g added water.

EXAMPLE 13

The procedure was as in Example 12, except that the preemulsified blend contained 29.9 g acrylamido glycolic acid butyl ester [AGABE] instead of the methyl ester [AGAME].

EXAMPLE 14

The procedure was as in Example 12, except that the preemulsified blend contained 63.4 g N-(2,2-dimethoxy-1-hydroxy)ethyl acrylamide [DMHEA] (50% w/w solution in water, 82% active) instead of the AGAME.

Binders were prepared from Examples 11-14 and tested as described above with the results shown in Table III. As before, results shown reflect the average of 8 tests and they are presented relative to the control batches which contain N-methylol acrylamide. Thus the figures against Examples 12-14 are percentages of the corresponding result for Example 11.

TABLE III

| Example Numbers | | Vinyl/Acrylic | | |
|---|---|---|---|---|
| | | Pulp | Rayon | Polyester |
| 11 | Dry | | (100) | |
| (NMA) | Wet | | | |
| | Solvent | | | |
| 12 | Dry | 79 | 79 | 100 |
| (AGAME) | Wet | 52 | 56 | 65 |
| | Solvent | 33 | 30 | 21 |
| 13 | Dry | 75 | 89 | 80 |
| (AGABE) | Wet | 32 | 56 | 53 |
| | Solvent | 16 | 32 | 21 |
| 14 | Dry | 95 | 97 | 91 |
| (DMHEA) | Wet | 75 | 86 | 81 |
| | Solvent | 67 | 102 | 74 |

Once again, DMHEA is seen to give good wet strength and solvent resistance and is the only formaldehyde-free crosslinker to give acceptable performance across all of the substrates.

The following Examples illustrate the use of DMHEA in a vinyl acetate homopolymer as a binder for fiberfill. The comparison is made with a commonly used fiberfill binder, whose performance properties and technical value are well known and which, as previously, is based on the crosslinking monomer N-methylol acrylamide.

EXAMPLE 15

The standard vinyl acetate emulsion homopolymer containing N-methylol acrylamide was prepared as a control according to the following. A 2 liter glass reactor equipped with a heating/cooling jacket, variable rate stirrer and means of metering monomers and initiators was employed. To the 2 liter reactor was charged 12 g (of a 25% w/w solution) calcium alkyl aryl polyethylene oxide phosphate, 0.8 g (of a 70% w/w solution) alkyl aryl polyethylene oxide (40 moles ethylene oxide), 0.8 g sodium vinyl sulphonate, 0.4 g calcium acetate and 400 g water. After purging with nitrogen, 50 g vinyl acetate were added and the reactor was equilibrated at 30° C. for 5 minutes.

The polymerization was started by heating to 60° C. and then adding a solution of 0.5 g sodium persulphate in 12 g water. The reaction was maintained by metered addition of a solution of 0.8 g sodium persulphate in 40 g water. The initiator was added at a uniform rate over 4 hours. Concurrently added with the initiator over the same period of 4 hours was a preemulsified blend of 450 g vinyl acetate, 0.8 g sodium vinyl sulphonate and 36.5 g N-methylol acrylamide (48% w/w solution in water) in a solution of 20 g (of a 25% w/w solution) calcium alkyl aryl polyethylene oxide phosphate, 15 g (of a 70% w/w solution) alkyl aryl polyethylene oxide (40 moles ethylene oxide) and 0.7 g calcium acetate in 96 g water. The temperature of the reaction was brought to and maintained at 74°-76° C. for the duration of the additions and for 45 minutes afterwards.

EXAMPLE 16

The procedure was as in Example 15, except that the preemulsified blend contained 74 g N-(2,2-dimethoxy-1-hydroxy)ethyl acrylamide [DMHEA] (50% w/w solution in water, 82% active) instead of the N-methylol acrylamide.

The binders were applied by diluting with water to 20% solids and adjusting the pH to 2.5. This preparation was then sprayed onto 12 inch squares of 12 gram/square foot polyester batting using a commercially available spraygun. The batts were dried for 1 minute on each side followed by a 1 minute cure at 130° C. in a Werner Mathis oven. The polyester batt was commercially produced and was a garnetted and crosslapped web of 6 denier Hoechst Celanese 295 fiber.

The batts were sewn into bags consisting of one side polyester tricot knit and the other 9×76 count bleached 80/20 polyester/cotton print cloth. The sewn bags were washed five times in a commercially available Sears Kenmore Model 80 washing machine along with ballast of five terrycloth towels. The machine settings were: water temperature warm/warm, water level medium and cycle time of cotton heavy. A 4oz cup of Tide detergent was added at the beginning of each wash. The batts were rated using the ASTM standard ratings and were not dried between washes. The results are shown in Table IV.

TABLE IV

| Example | Batt Weight g/ft$^2$ | % Binder Add-On | Wash Cycle | | | | |
|---|---|---|---|---|---|---|---|
| | | | 1 | 2 | 3 | 4 | 5 |
| 15 (NMA) | 11.8 | 22.4 | 5.0 | 5.0 | 5.0 | 5.0 | 4.5 |
| 16 (DMHEA) | 12.4 | 20.2 | 5.0 | 4.5 | 4.0 | 4.0 | 4.0 |

Ratings:
5 = best,
1 = worst.

The results presented in Table IV show that substitution of DMHEA into this standard fiberfill binder gave a product with very good wash performance compared to the control and is acceptable for many end-uses where durability is required.

The following Examples illustrate the use of DMHEA in a vinyl acetate homopolymer based emulsion prepared with a protective colloid such as polyvinyl alcohol and employed as a wood working adhesive. In evaluating the DMHEA containing polymer, the emulsion was compared with a commonly used wood working adhesive, whose performance properties and technical values are well known, comprising a protective colloid (polyvinyl alcohol) stabilized latex of vinyl acetate homopolymer incorporating the crosslinking monomer N-methylol acrylamide.

EXAMPLE 17

The standard vinyl acetate emulsion homopolymer stabilized by a protective colloid, polyvinyl alcohol, and containing N-methylol acrylamide was prepared as a control according to the following. A 2 liter glass reactor equipped with heating/cooling jackets, variable speed stirrer and means of metering monomer and initiator was employed. To the 2 liter reactor wall charged 135 g (of a 10% w/w solution in water) of medium viscosity, 88% hydrolyzed polyvinyl alcohol, 0.10 g sodium acetate, 0.50 g (of a 1% w/w solution in water) ferrous sulphate solution, 0.34 g sodium formaldehyde sulphoxylate, 1.25 g of Lanolubric (a coconut fatty acid defoamer), and 140 g of water. The PH was adjusted to 5.2 with phosphoric acid. After purging with nitrogen, 75 g of vinyl acetate was charged to the reactor.

The polymerization was then initiated at 60° C. by metering in a solution of 1.00 g of ammonium persulphate in 35 g of water and 0.59 g of sodium formaldehyde sulphoxylate in 35 g of water at a rate of 6 ml/hour. The reaction temperature was allowed to rise to 74° C. At this temperature, the catalyst solution addition rate was increased to 8 ml/hour.

Concurrently added with the initiator at 74° C. over a period of 3 hours were 425 g of vinyl acetate and 31.3 g of N-methylol acrylamide (48% w/w solution in water), both monomers being preemulsified with 1.67 g (of a 75% w/w solution in water) sodium salt of a dialkyl sulphosuccinate, 7.5 g (of a 70% w/w solution in water) alkyl aryl polyethylene oxide (30 moles ethylene oxide), 50 g (of a 10% w/w solution in water) of medium viscosity, 88% hydrolyzed polyvinyl alcohol, 3.5 g of 10% ammonium hydroxide solution and 115 g of water. On completing the addition of the preemulsified monomer mixture, the catalyst addition was continued for another half hour to ensure completion of reaction. The characteristics of the latex obtained are shown in Table I.

EXAMPLE 18

Using the general procedure described in Example 17, the test batch was prepared by replacing NMA by 36.5 g of DMHEA (50% w/w solution in water, 82% active) and the characteristics of the latex are shown in Table I.

In testing the emulsion polymers, the wood working adhesives were first formulated according to the following:

A—Latex base (Control/Test batch)=94.0
B—Ethylene glycol diacetate (Eastman Chemicals)=3.0 Water=3.0
C—Versenex 80 (Dow Chemicals CO.)=0.2 Water=0.2
D—Aluminium chloride solution (20% w/w)=5.0

The latex base 'A' was first mixed with the fusion aid 'B' to form a smooth dispersion followed by the iron scavenger 'C'. This mixture was allowed to age overnight. Then the cure accelerator 'D' was mixed in for 30 minutes.

Three ply birch veneer laminations were glued up with the grains perpendicular and using eight wet mils thickness of the above formulations. The laminations were then hot pressed at 100 psi. A hot press cure schedule of 150° C. for 30 minutes was selected (Ref. U.S. Pat. No. 3,252,931). From these constructions ten splints were cut into specimens one inch wide by five inches in length. A one inch notch in the center was cut 2/3 of the way through to the middle veneer yielding a one square inch test area. The laminated samples were allowed to cure for 7 days at room temperature.

After the seven-day cure period, five splint specimens from each lamination were subjected to four hours in boiling water followed by a 20 hour drying period @145° F. The specimens were then again immersed in boiling water for 4 hours followed by a 30 minute room temperature water soak.

The splint specimens were then pulled apart wet via an Instron Tester at 0.5 inches per minute. Results are reported as pounds per square inch required to pull the splints apart and the resulting percent wood tear observed. The results of the tests are shown in Table V.

TABLE V

| Specimen # | Example 17 (NMA) | | Example 18 (DMHEA) | |
| --- | --- | --- | --- | --- |
| | psi | % Tear | psi | % Tear |
| 1 | 135 | 100 | 140 | 95 |
| 2 | 125 | 100 | 130 | 85 |
| 3 | 120 | 100 | 120 | 100 |
| 4 | 120 | 100 | 115 | 10 |
| 5 | 130 | 100 | 135 | 85 |

The results in Table V indicate that N-methylol acrylamide [NMA] can be substituted with an equal weight of dimethoxyhydroxyethyl acrylamide [DMHEA] to give emulsion woodworking adhesives with excellent tensile strength and water resistance.

We claim:

1. A binder composition for nonwovens prepared from an emulsion polymer comprising more than 50% vinyl ester, 1 to 15% by weight of N-(2,2-dialkoxy-1-hydroxy)ethyl acrylamide wherein the alkoxy group contains 1 to 4 carbon atoms, and 5 to 35% by weight ethylene.

2. The emulsion polymer in the binder composition of claim 1 wherein the vinyl ester is vinyl acetate.

3. The emulsion polymer in the binder composition of claim 1 wherein the N-(2,2-dialkoxy-1-hydroxy)ethyl acrylamide is N-(2,2-dimethoxy-1-hydroxy)ethyl acrylamide.

4. The emulsion polymer in the binder composition of claim 1 additionally comprising up to 44% by weight vinyl halide.

5. The emulsion polymer in the binder composition of claim 1 additionally comprising up to 44% by weight of one or more $C_1$-$C_8$ alkyl acrylates or methacrylates.

6. The emulsion polymer in the binder composition of claim 1 additionally comprising up to 10% by weight of an olefinically unsaturated carboxylic acid having from 3 to 6 carbon atoms.

7. The emulsion polymer of claim 6 wherein the acid is acrylic acid or methacrylic acid.

8. The emulsion polymer in the binder composition of claim 1 additionally comprising up to 15% by weight hydroxyalkyl ($C_2$ to $C_4$) acrylate of methacrylate.

9. The emulsion polymer of claim 8 wherein the hydroxyalkyl acrylate is hydroxypropyl acrylate or hydroxyethyl acrylate.

10. A nonwoven binder composition of claim 1 comprising vinyl acetate, 5 to 35% by weight ethylene, 1 to 15% by weight N-(2,2-dimethoxy-1-hydroxy)ethyl acrylamide and up to 10% by weight hydroxypropyl acrylate.

* * * * *